Figure 1:
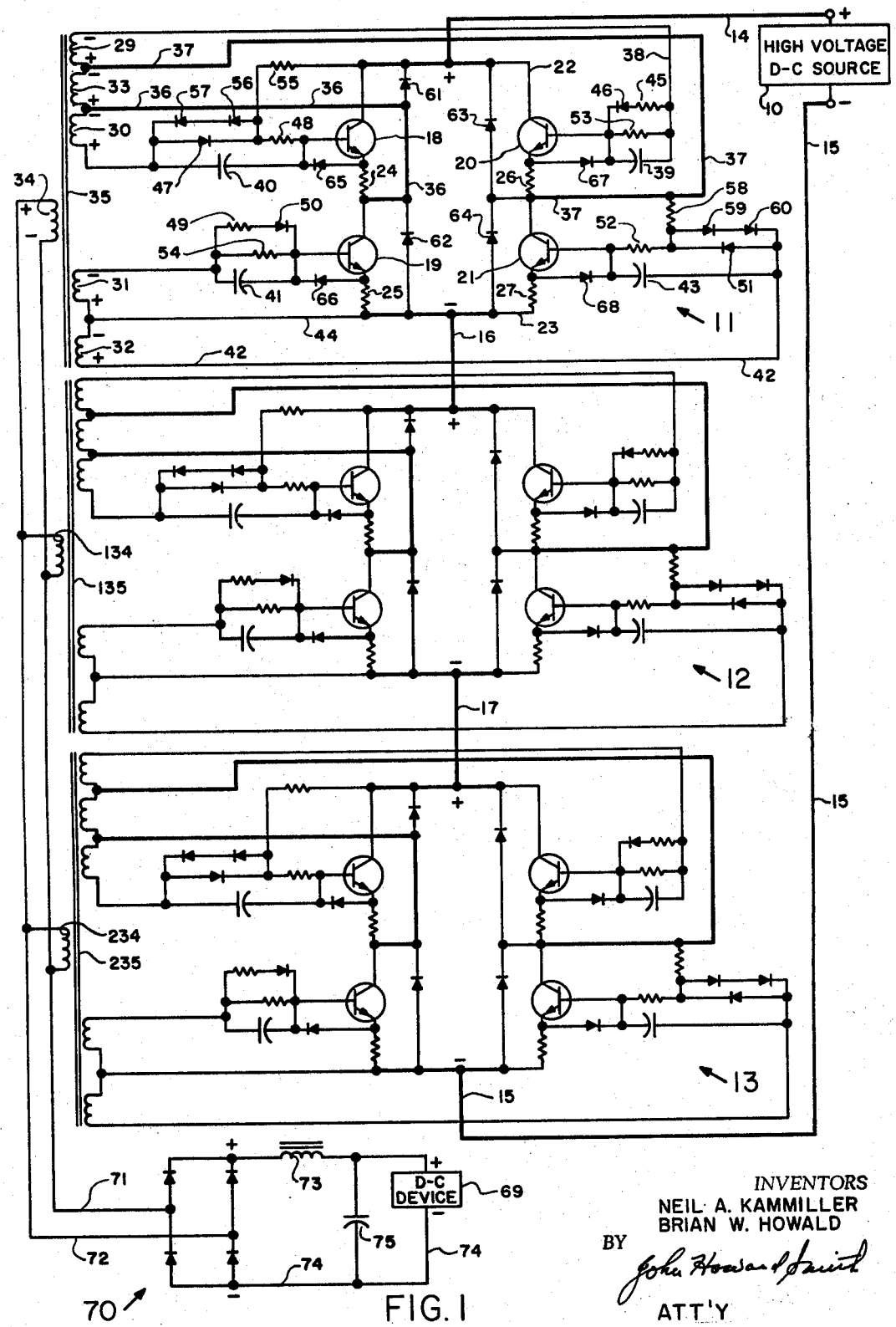

FIG. I

INVENTORS
NEIL A. KAMMILLER
BRIAN W. HOWALD
BY John Howard Smith
ATT'Y

June 25, 1968 N. A. KAMMILLER ET AL 3,390,320
TRANSISTOR INVERTER FOR SYNCHRONIZED OPERATION
WITH A LIKE PARALLELED INVERTER
Filed June 13, 1966 2 Sheets-Sheet 2

INVENTORS
NEIL A. KAMMILLER
BRIAN W. HOWALD
BY
ATT'Y.

United States Patent Office 3,390,320
Patented June 25, 1968

3,390,320
TRANSISTOR INVERTER FOR SYNCHRONIZED OPERATION WITH A LIKE PARALLELED INVERTER
Neil A. Kammiller, North Olmsted, and Brian W. Howald, Amherst, Ohio, assignors to Lorain Products Corporation, a corporation of Ohio
Filed June 13, 1966, Ser. No. 558,199
11 Claims. (Cl. 321—2)

This invention relates to inverters and is directed more particularly to a transistor inverter adapted to operate in parallel with a like inverter.

It is often desirable to increase the power being delivered to a load by a D-C to A-C inverter. This may be done by paralleling the outputs of one or more additional inverters with the first inverter. However, since these inverters supply alternating current, the output voltages must be in phase in order that any interchange of power between the inverters may be prevented. Thus some means of establishing synchronized operation of the inverters must be furnished at low cost and without special, complex synchronizing circuits.

Accordingly, it is an object of this invention to provide an inverter, which, together with a like parallel inverter, will supply in-phase alternating voltages to a load without the necessity of special synchronizing circuits or leads.

It is another object of the invention to provide an inverter embodying a saturable transformer having a novel winding arrangement and switching elements which switch simultaneously with the switching elements of one or more like paralleled inverters.

It is also an object of this invention to provide an improved multi-inverter system wherein the inputs of the inverters are connected in series and the outputs thereof are connected in parallel whereby the output voltages are in phase and the input voltage is equally divided between the inverters.

Yet another object of the invention is to provide an inverter having a saturable core transformer in which the leakage reactance between an output winding and feedback windings provided thereon is less than the leakage reactance between an output winding and a primary winding of the transformer, the primary winding being supplied with alternating voltage from switching means connected between the primary winding and a D-C source whereby like paralleled inverters will switch simultaneously without the need of additional synchronized circuitry.

Another object of the invention is to provide an inverter including transistor switching means and a saturable core transformer having a primary winding energized with alternating voltage from the transistor switching means, an output winding adapted to be connected to a load across which there is connected an output winding of a like inverter and feedback windings connected to respective transistors, the feedback windings being more closely coupled to the output winding than to the primary winding. With this arrangement, when a low impedance appears across the output winding due to the operation of one of the paralleled inverters, the impedance reflected onto the drive windings causes the transistors to switch thereby reversing the voltage applied to the primary winding. Since the low impedance will be imposed simultaneously on the outputs of all parallel inverters, all the inverters will switch simultaneously to produce in-phase output voltages.

It is a further object of the invention to provide a transistor inverter in which the switching action is normally controlled by the voltage on the feedback windings of the saturable core transformer but in which the drive windings will be controlled by the transformer output winding if the output winding is connected in parallel relationship to the output winding of a like, second inverter having a shorter core saturation time than the first inverter. Thus where the output means of the plurality of such inverters are paralleled, the inverter having the shortest core saturation time will control the switching action of the other inverters and will therefore become the control inverter to dictate the switching action of all the other inverters regardless of the saturation time of their cores. Under these circumstances, the transistor switching action of all the inverters will be simultaneous and in-phase with no lag of switching operation between the control inverter and others whereby maximum power and the desired output waveform is obtained from a system embodying my invention.

Figure 2:
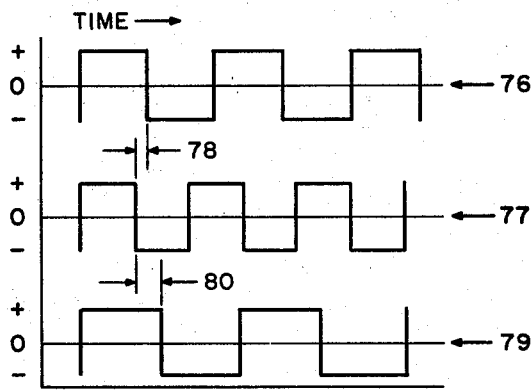
Figure 3:
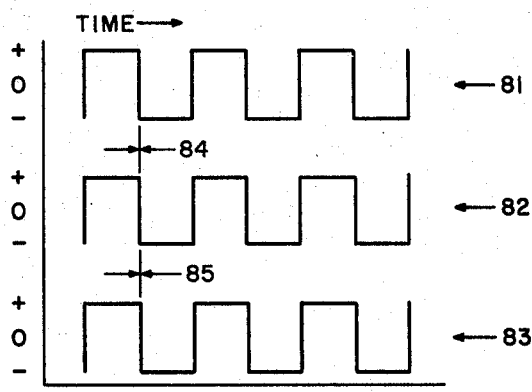
Figure 4:
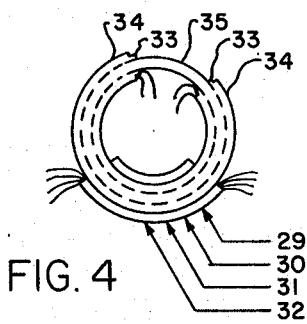

Other objects and advantages of the invention will become apparent from the following description and drawings in which:

FIGURE 1 is a schematic diagram of circuitry embodying the invention,

FIGURE 2 illlustrates the output voltage waveshapes of a number of inverters not connected in parallel relationship, FIGURE 3 illustrates the output waveshapes of the same inverters when the outputs are connected in parallel and utilize the features of my invention, FIGURE 4 is a pictorial representation showing the arrangement of windings on the inverter transformer.

Referring to FIGURE 1, there is shown a high voltage D-C source 10 across which inverters 11, 12 and 13 are serially connected by means of leads 14 and 15. A lead 16 interconnecting inverters 11 and 12 and the lead 17 interconnecting the inverters 12 and 13 completes the serial connection of the inverters, which serial connection advantageously causes the voltage of the source 10 to be equally divided among the inverters. This arrangement allows a plurality of relatively low voltage inverters to be connected across a high voltage source without exceeding the maximum voltage rating of any one of the inverters. This avoids the necessity of utilizing a single, more costly, high voltage inverter to accommodate the high voltage source.

Since the inverters 11, 12 and 13 are identical, only the inverter 11 will be described in detail. Inverter 11 may include switching means such as NPN type transistors 18, 19, 20 and 21 which are formed into a bridge configuration by serially connecting the collector-emitter circuits of first conducting, companion transistors 18 and 19 between D-C leads 22 and 23 and by serially connecting the collector-emitter circuits of transistors 20 and 21 between the same D-C leads. The leads 22 and 23 serve as D-C input means. It will be understood that PNP type transistors may be used if the polarities in the circuit are reversed.

Transistors 18, 19, 20 and 21 are protected from excessive current by resistors 24, 25, 26 and 27 connected in the respective emitter circuits.

To the end that companion transistors 18 and 21 will conduct when companion transistors 19 and 20 are non-conducting and vice-versa to produce an alternating voltage between the collector electrodes of transistors 19 and 21, there is provided a transformer 28 having feedback windings 29, 30, 31 and 32, a primary winding 33 and an output winding 34 all carried on a core 35. The winding 34 serves as output means for the inverter 11.

The preferred physical arrangement of the windings on a toroidal core is shown in FIGURE 4. It will be understood, of course, that other core forms may be used. In the arrangement shown, the feedback windings 29, 30, 31 and 32 are bifilar wound particularly when high frequency operation is encountered. However, these feedback windings may be wound separately and spaced at equal distances from one another on the core when operation at relatively low frequencies, that is frequencies in the general range of 1000 cycles per second and below, are contemplated.

In order to apply the alternating voltage produced by the transistor bridge to the primary winding 33, the collector electrodes of transistors 18 and 21 are connected to the primary winding via leads 36 and 37, respectively. It will be seen that conduction of the transistors 18 and 21 connect the primary winding leads 36 and 37 to the positive and negative leads 22 and 23, respectively, causing the lower end of primary winding 33 to be positive with respect to the upper end. When the transistors 19 and 20 conduct, the transistors 18 and 21 having turned off, the voltage on the primary winding 33 will reverse. Thus alternate conduction of transistor pairs 18, 21 and 19, 20 produce an alternating voltage on the primary winding 33.

The desired alternate conduction of the companion transistor pairs is achieved by connecting the upper end of feedback winding 29 to the base electrode of transistor 20 via a lead 38 and a coupling capacitor 39; the lower end of the feedback winding 30 to the base electrode of the transistor 18 through a coupling capacitor 40; the upper end of feedback winding 31 to the base electrode of the transistor 19 through a coupling capacitor 41 and the lower end of the feedback winding 32 to the base electrode of the transistor 21 via a lead 42 and a coupling capacitor 43. The base-emitter feedback circuits of the companion transistors 19 and 21 are completed by the provision of a lead 44 connected between the feedback windings 31, 32 and the negative lead 23 to which the emitter elecrodes of the transistors 19 and 21 are connected. By connecting the lower end of feedback winding 29 to the primary winding lead 37 and the upper end of the feedback winding 30 to the primary winding lead 36 the base-emitter connections of companion transistors 18 and 21 are completed.

The coupling capacitors 39, 40, 41 and 43 pass either positive-going or negative-going wavefronts from the feedback windings to respective ones of the transistors. Whether the wavefront is positive going or negative going is dependent upon whether the ends of the feedback windings connected to the transistor base electrode are becoming more positive or more negative.

Positive-going wavefronts cause the transistors to which such wavefronts are applied to turn on, while negative-going wavefronts cause the receiving transistors to turn off. However, these wavefronts are of short duration and after turning respective transistors off or on do nothing to maintain the transistors any particular state of conduction.

To the end that any of the transistors 18, 19, 20 and 21, after being rendered conducting, will continue to conduct until the voltage across the respective feedback windings 29, 30, 31 and 32 reverses, hold-on circuit means are provided in the base circuits of each of the transistors. The hold-on circuits may take the form of a resistor 45 and a diode 46 connected in parallel with coupling capacitor 39; a diode 47 and a resistor 48 in parallel with capacitor 40; a resistor 49 and a diode 50 connected in parallel with capacitor 41 and a diode 51 and a resistor 52 connected in parallel with capacitor 43.

The hold-on circuits provide current paths in parallel with the coupling capacitors thus allowing current to flow from the feedback windings through the base-emitter circuits of respective ones of the transistors when the base connected ends of the feedback windings are positive with respect to the emitter connected ends. However, from the previously described alternate conduction of transistor pairs 18, 21 and 19, 20 it will be understood that each hold-on circuit is operative only when the polarity of the associated feedback winding is such as to apply positive voltage to the base of the transistor to which it is connected.

Because the coupling capacitors 39, 40, 41 and 43 pass only wave fronts, that is the leading or trailing edges of rectangular voltage pulses, it is desirable to provide hold-off circuits for transistors 18, 19, 20 and 21 in addition to the hold-on circuits described above. The hold-off circuits for transistors 19 and 20 include resistors 53 and 54 connected across the coupling capacitors 39 and 41, respectively. The resistors 53 and 54, with the respective feedback windings 29 and 31, provide paths to shunt transistor collector to base leakage current around the base-emitter circuits of the transistors 19 and 20 when those transistors are nonconducting. This shunting action prevents the leakage current from developing base-emitter voltage and, therefore, from turning the transistors on. Thus, once turned off, the transistors will not conduct again until forward bias voltage is applied thereto from the feedback windings.

Hold-off circuits for transistors 18 and 21 are partially included in starting circuits which will now be described.

In order to insure that switching activity of the transistors 18, 19, 20 and 21 will being when D-C energizing voltage is applied to the leads 22 and 23, starting circuit means are provided for the first conducting, companion transistors 18 and 21. The starting circuit for transistor 18 includes a resistor 55 and diodes 56, 57 serially connected between the positive lead 22 and the lower end of the feedback winding 30. A point between the resistor 55 and the diode 56 is connected to a point between the diode 47 and the resistor 48. The starting circuit for the transistor 21 includes a resistor 58 and diodes 59, 60 serially connected between the primary winding lead 37 and the feedback winding lead 42. A point between the resistor 58 and the diode 59 is connected to a point between the diode 51 and the resistor 52.

When the voltage is applied to the D-C leads 22 and 23 current will flow from the positive lead 22 through resistor 55, diodes 56, 57 windings 30 and 33, lead 37, resistor 58, diodes 59, 60, lead 42, winding 32, and lead 44 to the negative lead 23. The voltage produce across the diodes 56 and 57 by the current is applied between the base and emitter electrodes of transistor 18 via resistor 48 and the path formed by winding 30, lead 36 and resistor 24 thereby forward biasing the transistor. Similarly, the voltage generated on diodes 59 and 60 by the current forward biases transistor 21. Thus transistors 18 and 21 will be rendered conducting by the starting circuits when inverter 11 is first energized.

It will be seen the resistor 48, diodes 56 and 57, the feedback winding 30 and lead 36 establish a current path from the base electrode of transistor 18 to the emitter connected resistor 24. This path shunts leakage current around the base-emitter circuit of the transistor 18 when it is nonconducting. Thus the components forming this current path and including the starting circuit diodes 56 and 57 serve as hold-off means to prevent the transistor 18 from turning on until a suitable forward bias voltage is applied thereto from the feedback winding 30. A similar hold-off circuit for transistor 21 is provided by the resistor 52, starting diodes 59, 60, lead 42, feedback winding 32 and lead 44.

To protect the transistors 18, 19, 20 and 21 from destructive reverse voltage spikes, diodes 61, 62, 63 and 64 may be connected between the collector electrodes of the respective transistors and the lower ends of emitter resistors 24, 25, 26 and 27, respectively. Excessive voltages are prevented from appearing in the base-emitter circuits of the transistors by diodes 65, 66, 67 and 68 connected between the base and emitter electrodes of the transistors 18, 19, 20 and 21, respectively.

The alternating output voltages of the inverters 11, 12 and 13 may be used to energize a D-C device 69 by connecting the output winding 34 to the input terminals of a bridge rectifier 60 via leads 71 and 72. The positive output terminal of the rectifier 70 is connected to the D-C device 69 through filter choke 73 while the negative terminal of the rectifier is connected to the D-C device by means of a lead 74. Additional filtering of the D-C is provided by a filter capacitor 75 connected across the D-C device 69. The output windings 134 and 234 of the inverters 12 and 13, respectively, are connected across the connecting leads 71 and 72 and are in parallel with the output winding 34 of the inverter 11. The D-C device 69 and the rectifier 70 are included in what may be termed the load for the inverters 11, 12, and 13.

It will be seen that series connection of the input circuits of inverters 11, 12 and 13 is advantageous in that a plurality of inverters may be energized from a single D-C source, the voltage of which may be excessive for any one inverter. With this arrangement, the input currents and voltage of the inverters are equal and produce a stabilizing effect on the operation of the inverters.

Core operation of the foregoing circuitry will now be explained with respect to inverter 11 (inverters 12 and 13 being the same) and assuming that the leads 71 and 72 are not connected to the output windings 34, 134 and 234. Thus the three inverters shown are not operating in parallel for the purpose of this description. When the leads 14 and 15 are connected to the high voltage D-C source 10 under the above circumstances, one-third of the voltage will be impressed across each of the inverters 11, 12, and 13. As explained previously, when D-C voltage is applied to the leads 22 and 23, the starting circuits will render transistors 18 and 21 conducting. With transistors 18 and 21 conducting, the voltage polarities on the transformer windings 29, 30, 31, 32, 33 and 34 are as shown in FIGURE 1. This condition persists until core 35 saturates whereupon the polarities of the transformer windings reverse causing transistors 18 and 21 to turn off and rendering transistors 19 and 20 conducting. The transistors 19 and 20 will conduct until core 35 again saturates at which time the polarities of transformer windings 29 through 34 will become opposite to those shown in FIGURE 1 and transistors 18 and 21 will turn on. The alternating voltage developed on the output winding 34 of inverter 11 by the switching action of the transistors 18, 19, 20 and 21 is illustrated at 76 in FIGURE 2.

Now, for purpose of explanation, it will be assumed that the transformer core 135 of inverter 12 has a shorter core saturation time than the core 35 of inverter 11. Consequently, the inverter 12 will run at a higher frequency than inverter 11 provided that the output windings are not interconnected and thus one feature of my invention is not utilized and will generate an output voltage on winding 134 as shown at 77 in FIGURE 2. The length of time by which each half-cycle of operation of inverter 11 exceeds that of inverter 12 is indicated at 78.

Assuming now that the transformer core 235 of inverter 13 has a longer saturation time than the core 35, the normal frequency of inverter 13 will be lower than that of inverter 11 or inverter 13. The output voltage waveshape of inverter 13 is shown at 79 in FIGURE 2 while the additional time required for saturation to generate each half cycle of operation over that of inverter 12 is shown at 80.

If now the output windings 34, 134 and 234 of the inverters 11, 12 and 13 are connected in parallel across the leads 71 and 72, inverter 12 which has the transformer core with the shortest saturation time will become the control inverter in accordance with my invention. As a result, the output voltages of the three inverters will have the same waveshape, will be in phase and will assume the shape and phase of the wave 82 (that of the core having the shortest saturation time). The lag of operation of inverters 11 and 13 behind 12 is zero as indicated at 84 and 85, respectively. Thus the switching action of the transistors of the inverters occurs simultaneously and is controlled by the inverter having the transformer core with the shortest saturation time, which is inverter 12 in this case.

The inverter 12 operates in the same manner as explained previously in regard to inverter 11. Accordingly, it will be seen that the transistors of inverter 12 switch each time the core 135 saturates.

When the core 135 saturates, the impedance of the output winding 134 drops to a low value. This low impedance condition is also imposed on output winding 34 and 234 since they are connected in parallel with winding 134.

As a result of the novel winding arrangement provided in the circuitry embodying the invention, the drive windings 29, 30 31 and 32 are more closely coupled to the output winding 34 than to the primary winding 33. Consequently, the low impedance of winding 34 is reflected onto the feedback windings 29, 30, 31 and 32 causing the voltages thereon to decrease despite the tendency of the primary winding 33 to maintain the voltage on those windings at a prescribed value until the core 35 saturates. The decrease of the feedback winding voltage causes the collector-emitter current of the conducting pair of transistors to decrease and, consequently, the primary winding 33 current decreases. A cumulative action ensues by which the conducting pair of transistors rapidly turns off and the nonconducting pair rapidly turns on. This condition will persist until either a low impedance is again impressed on the output winding 34 from the output winding 134 or the core 35 saturates. In view of the core 135 having a shorter saturation time than core 35, the first alternative will be prior in time.

The operation of the inverter 13 is the same as that of inverter 11 and is controlled by inverter 12.

While the schematic of FIGURE 1 shows three inverters having their inputs connected across a source of voltage which would be excessive for any single one of the inverters, it will be understood that more or fewer inverters can be so connected depending upon the magnitude of the D-C source voltage.

From the foregoing it will be seen that the invention, as embodied in a D-C to A-C inverter, allows the inverter output means to be connected in parallel with the output means of one or more like inverters without requiring special synchronizing circuits or leads. One of the paralleled group of inverters, due to the inherent differences in the transformers of the inverters, will become a control inverter with the result that the switching action of all the inverters is synchronized.

It will be understood that the embodiment shown herein is for explanatory purposes and may be changed or modified without departing from the spirit and scope of the invention as set forth in the claims appended hereto.

What is claimed is:

1. In an inverter system adapted to operate from a relatively high voltage D-C source to supply A-C to a load, in combination, a plurality of inverters having D-C input means and A-C output means, means for serially connecting said D-C input means across said D-C source, means for connecting said A-C output means in parallel across said load, each inverter including a transformer having a saturable core, primary winding means carried on said core, switching means, means for connecting said primary winding and said switching means to the D-C source to produce a time varying voltage on said primary winding, output winding means carried on said transformer core outside of said primary winding, means for connecting said output winding means to said A-C output means, feedback winding means carried on said transformer core outside of said output winding means, means for connecting said feedback winding means to said switching means to render said switching means alternately conducting and nonconducting, said feedback winding means being more closely coupled to said output winding means than to said primary winding means whereby when the impedance of the output winding of a paralleled inverter decreases before said core of said transformer saturates, the voltage reflected on said feedback winding means from said output winding means switches said switching means.

2. The arrangement as set forth in claim 1 in which said switching means comprises a plurality of transistors connected in a bridge configuration having A-C terminals connected to said primary winding means and D-C terminals serially connected with the D-C terminals of like inverters across said D-C source, the input of each transistor being connected to respective feedback winding means.

3. The arrangement as set forth in claim 1 in which said primary, output and feedback winding means are wound on a common core, said primary winding means being closest to said core and said drive winding means being farthest from said core.

4. In a saturable transformer type inverter adapted to be energized from a D-C source and to have the output voltage thereof applied to a load in parallel relationship to the output voltage of at least one other like inverter also applying voltage to the load, in combination, a transformer having a saturable core with primary, output and feedback winding means carried thereon, the leakage reactance of said core being less between said output winding means and said feedback winding means than between said output winding means and said primary winding means, switching means, means for connecting said switching means and said primary winding means in circuit relationship with the D-C source, means for connecting said feedback winding means to said switching means to control the conduction thereof, means for connecting said output winding means to a load, the relationship of leakage reactance between said primary, output and feedback winding means switching said switching means when the impedance of the output winding of a parallel inverter decreases before said core of said transformed saturates.

5. The arrangement as set forth in claim 1 in which said primary, output and feedback winding means are wound on a common core, said primary winding means being closest to said core and said drive winding means being farthest from said core.

6. In a saturable transformer type inverter adapted to be energized from a D-C source and to have the output voltage thereof applied to a load in parallel relationship to the output voltage of at least one other like inverter also applying voltage to the load, in combination, a transistor bridge, each arm of which includes the collector-emitter circuit of a transistor having emitter, collector and base electrodes, said bridge having D-C input means for connection to the D-C source and A-C output means, a transformer having a saturable core provided with a primary and an output winding, and with a feedback winding for each transistor in said bridge, the leakage reactance of said core being less between said output winding and said feedback windings than between said output winding and said primary winding, means for connecting said primary winding to said A-C output means of said transistor bridge, means for connecting said output winding to a load, means for connecting said respective feedback windings between the base and emitter electrodes of respective ones of said transistors of said bridge to control the conduction thereof, the differential of leakage reactance between said primary, output and feedback windings causing said transistors to switch when the impedance of the output winding of a paralleled inverter decreases before said core of said transformer saturates.

7. The arrangement as set forth in claim 6 in which said primary, output and feedback winding means are wound on a common core, said primary winding means being closest to said core and said drive winding means being farthest from said core.

8. The arrangement as set forth in claim 6 and including voltage dropping means connected between the collector electrodes of certain of said transistors and the base connected ends of respective ones of said feedback windings, said base electrodes of said certain transistors being connected to a point on respective voltage dropping means whereby the voltage developed on said voltage dropping means renders said certain transistors conducting when the inverter is connected to the D-C source.

9. The arrangement as set forth in claim 6 in which first unidirectional conducting means and first resistive means are serially connected between said base electrodes of each transistor and the respective ones of said feedback windings, said unidirectional conducting means being poled to pass forward bias current from said feedback winding means to said base electrodes of respective ones of said transistors, second unidirectional conducting means connected in parallel with said first unidirectional conducting means of certain of said transistors, said second unidirectional means being oppositely poled to said first unidirectional conducting means whereby collector-base current can pass from the base electrodes of said certain transistors to the feedback windings of said transistors to hold said certain transistors in nonconducting condition until a forward bias is applied thereto from said certain feedback windings, second resistive means connected between said base electrodes of others of said transistors and the base connected ends of others of said feedback windings, said second resistive means being connected in parallel with the series combination of said first resistive means and said first unidirectional conducting means to pass collector-base current from said base electrodes of said other transistors to respective ones of said other feedback windings to hold said other transistors in nonconducting condition until forward bias is applied thereto.

10. The arrangement as set forth in claim 6 and including starting means connected to respective first conducting, companion transistors, said starting means comprising respective resistive and unidirectional conducting means serially connected between the respective collector electrodes of said respective first conducting, companion transistors and the respective base connected ends of respective feedback windings, said base electrodes of said transistors being connected to a common point between said resistive means and said unidirectional conducting means of respective starting means, said unidirectional conducting means being poled to pass current in a direction such that the voltage across said unidirectional conducting means forward biases the respective, first conducting, companion transistors.

11. The arrangement as set forth in claim 6 in which said feedback windings are electrically connected to the base electrodes of respective transistors, said electrical connections including turn-on capacitors, hold-on circuits connected in parallel with each turn-on capacitor and including the series combination of resistive means and unidirectional conducting means, said unidirectional conducting means being poled to pass current from said feedback windings to the base emitter circuits of respective transistors.

References Cited

UNITED STATES PATENTS

| | | | |
|---|---|---|---|
| 3,118,115 | 1/1964 | Jensen | 321—27 XR |
| 3,310,727 | 3/1967 | Flannery | 321—27 XR |
| 3,328,596 | 6/1967 | Germann et al. | 321—45 XR |

FOREIGN PATENTS 694,850  9/1964  Canada.

JOHN F. COUCH, *Primary Examiner.*

WARREN E. RAY, *Examiner.*

W. SHOOP, *Assistant Examiner.*